Feb. 8, 1972 T. B. BABA 3,640,980
CONTINUOUS PROCESS FOR THE PRODUCTION OF ALFIN POLYMERS
BY POLYMERIZATION OF ALFIN MONOMERS IN AN ORGANIC
SOLVENT AND FOR RECOVERING AND RECYCLING SOLVENT
Filed Oct. 4, 1967 3 Sheets-Sheet 1

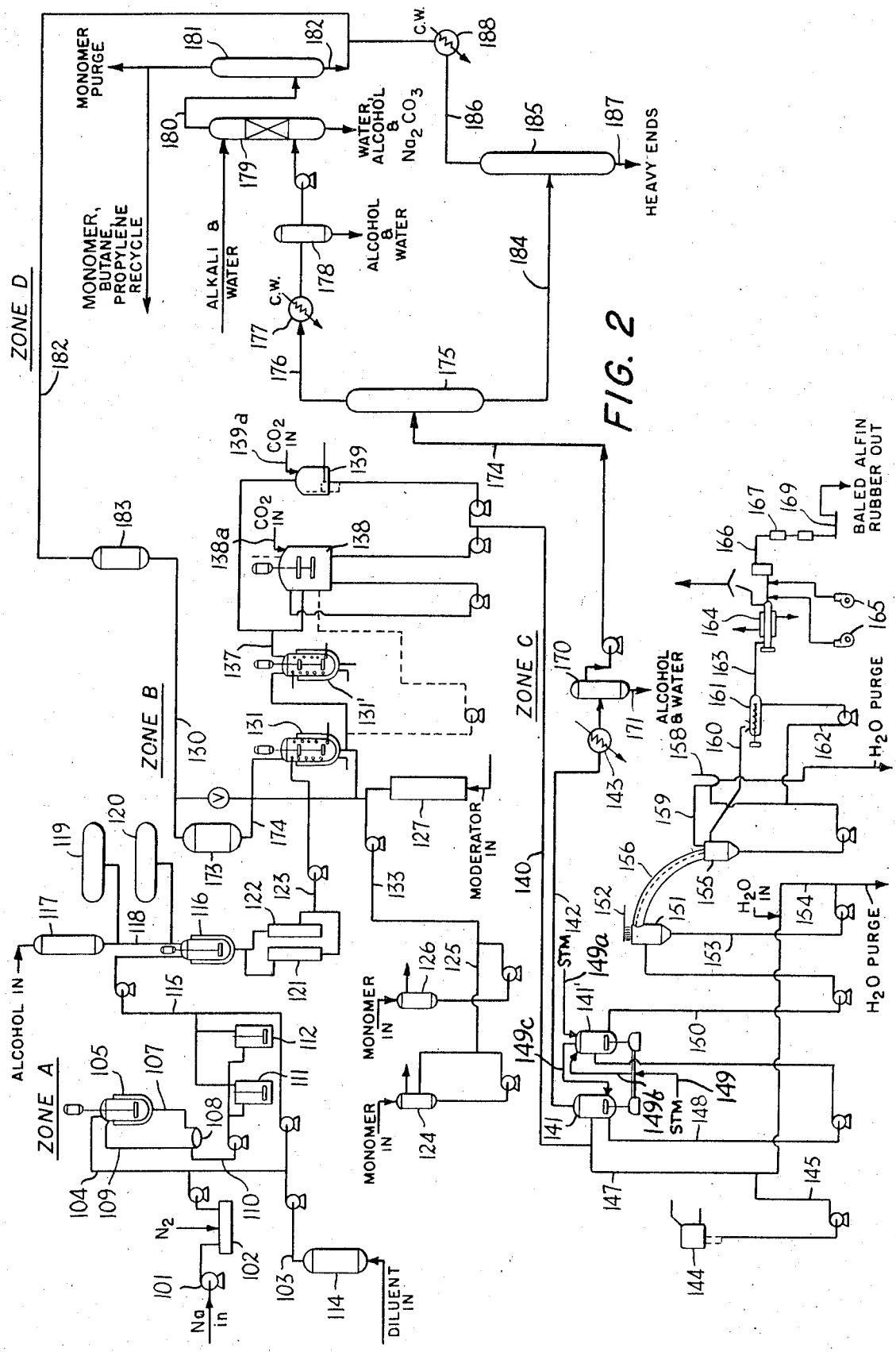

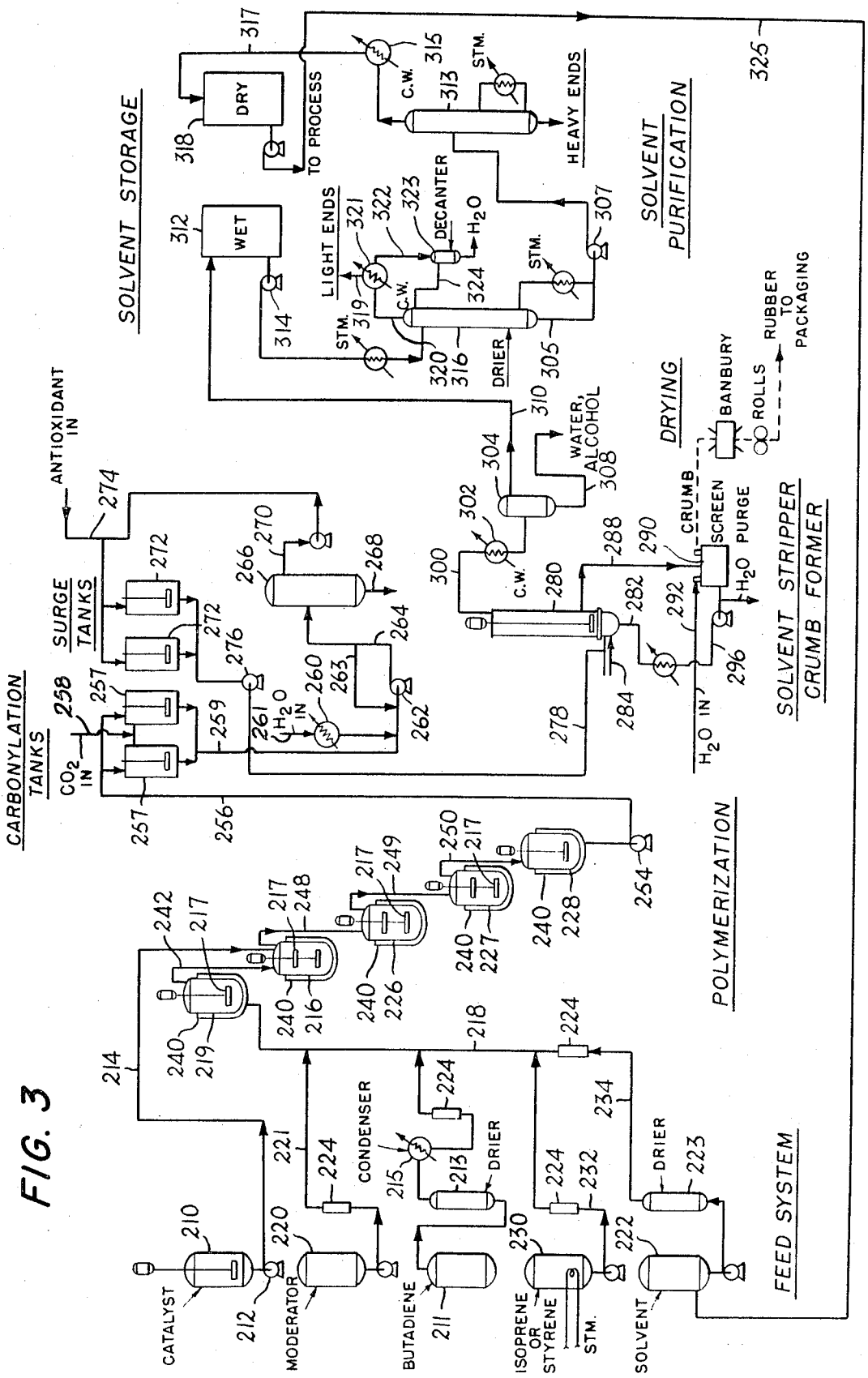

United States Patent Office 3,640,980
Patented Feb. 8, 1972

3,640,980
CONTINUOUS PROCESS FOR THE PRODUCTION OF ALFIN POLYMERS BY POLYMERIZATION OF ALFIN MONOMERS IN AN ORGANIC SOLVENT AND FOR RECOVERING AND RECYCLING SOLVENT
Theodore B. Baba, Hillsdale, N.J., assignor to National Distillers and Chemical Corporation, New York, N.Y.
Filed Oct. 4, 1967, Ser. No. 672,895
Int. Cl. C08d 5/00
U.S. Cl. 260—82.1
22 Claims

ABSTRACT OF THE DISCLOSURE

A continuous process for the preparation of alfin polymers is provided, effecting the polymerization of the monomer by an alfin catalyst in the presence of a molecular weight moderator, treating the alfin polymer reaction mixture with a small amount carbon dioxide to convert organometallic compounds to organic acid salts, extracting the acid salts with water and separating unreacted monomer, volatile low polymer and solvent, and thereafter purifying solvent and recycling it and optionally the monomer for reuse, and washing and drying the alfin polymer.

---

This invention relates to a process for the continuous production of alfin polymers, and more particularly to a continuous process for the production of alfin polymers from the monomer in the presence of a solvent, treating the alfin polymer reaction mixture with carbon dioxide and recovering and recycling solvent and, optionally, unreacted monomer.

Morton and coworkers in a series of papers in the Journal of the American Chemical Society, starting in 1947, described an organoalkali metal catalyst for the polymerization of olefins and particularly dienes which they term an alfin catalyst, Journal of the American Chemical Society 69, 161; 167; 950; 1675; 2224 (1947). The name "alfin" is taken from the use of an alcohol and an olefin in their preparation. The alcohol, a methyl n-alkyl carbinol, usually isopropanol, in the form of the sodium salt, the olefin, also in the form of the sodium salt, and an alkali metal halide, form a complex that constitutes the catalyst.

These catalysts are reported by Morton et al. to cause the polymerization of butadiene, isoprene and other dienes, alone and together with other copolymerizable organic compounds, in most cases olefinic in nature. The catalyst was discovered in the course of a study of the addition of organosodium compounds to dienes. Later on, Morton summarized the work done up until 1950 in Industrial and Engineering Chemistry, 42, 1488–1496 (1950).

Exemplary of early interest in the use of alfin catalysts is U.S. Pat. No. 2,592,301, patented Apr. 8, 1952 to Robert G. Linville. Using a batch technique, Linville formed polymers of 1,4-dicyano-2-butene by subjecting the monomer to polymerization conditions in the presence of an alfin catalyst. The polymers were said to be useful as intermediates for the synthesis of polyamines for shrink-proofing wool carboxylic acids, etc.

U.S. Patent No. 2,606,179 to Boyd, patented Aug. 5, 1952, described the polymerization of ethylene, using an alfin catalyst in an aliphatic hydrocarbon solvent. The polyethylene produced was said to be distinguished by its clarity, hardness and stability, and had a molecular weight in excess of 20,000.

Foster in U.S. Patent No. 2,841,574, patented July 1, 1958 claimed that vastly improved results in alfin-type polymerizations can be obtained by using as the solvent certain ethers, acetals, and amines. Foster suggested that the polymerization was effected by an entirely different reaction mechanism than theretofore obtained with alfin catalysts. Foster polymerized propenyl benzene, obtaining a polymer having a molecular weight of about 4500. Polybutadiene was also obtained, but the molecular weight was not given.

The elastomer polymers obtained from dienes, alone or copolymerized with olefins, using alfin catalysts are termed alfin polymers or alfin rubbers. Because of the speed and ease of the reaction, these attracted considerable interest in the 1940's and early 1950's. However, the very speed of the reaction led to problems. The alfin rubbers have the disadvantage of having an extremely high molecular weight, generally in excess of 3,000,000 and frequently in excess of 10,000,000. As a result, although these polymers are generally gel-free and have high tensile strength, superior abrasion resistance, and tear strength, they are also very tough, and exhibit little breakdown and consequently poor banding on the mill. Therefore, they are difficult if not impossible to process using conventional equipment. Consequently, interest and research in the alfin rubbers until recently was minimal, and in their original form the alfin rubbers have found very little commercial application.

Diem, Patent No. 2,856,391, patented Oct. 14, 1958, describes alfin type polymerizations obtained using a lithium alkoxide and an alkenyl lithium compound. The polymers were soft, and easily formed into smooth sheets on a rubber mill, in contrast to alfin polymers which required considerable mill breakdown and/or the addition of oils to produce a smooth sheet on the mill, according to Diem.

In all of the above patents, batch techniques were employed to produce the polymers. Batch techniques are however inefficient, and difficult to adapt to a commercial process. Patent No. 2,606,179 suggests that the system employed could be easily adapted for continuous polymerization, because the polymer settles to the bottom of the reaction vessel and may be drawn off therefrom, but in fact no continuous system is described.

Patent No. 3,197,448, patented July 27, 1965, to Gavlin, Hedman, and Hubbard, describes the production of elastomers by subjecting propylene and budadiene mixtures to the action of an alfin catalyst. A batch technique is used. There is no reference to a continuous process.

The difficulties in attempting to prepare alfin polymers by a continuous process are outlined in part by Kizer, Klopfer and Burke in U.S. Patent No. 3,074,924, patented Jan. 22, 1963. Kizer et al. explain that alkali metal polymerizations of elastomers have generally been restricted to batch-wise or semi-continuous alternate batch-wise systems, because of the long periods required to initiate polymerization ad carry it to the desired conversion. Kizer et al. noted that it had been proposed to carry out such polymerizations in continuous tubes, with the materials kept stirred up and advanced along the tubes by internal screw means, but such reactors have not been satisfactory, because of the tendency of the sticky polymer to build up on the walls of the reactor and on the screw, producing variable hold-up and consequently non-uniformity of the polymer, and ultimately complete clogging of the apparatus, requiring that it be taken out of service for clean-out.

Kizer et al. describe a system in which the nonaqueous liquid diluent for the reaction mixture is established in a longitudinally flowing elongated cylindrical stream, into which is introduced a polymerization catalyst, and then the monomer, conducting the polymerization in an extended region of the stream, which is maintained free of agitation and at substantially nonturbulent laminar flow, diverting the inner portions of the body of polymer progressively outwardly towards the periphery of the stream as the body flows longitudinally, and progressively discharging the longitudinally-moving thin annular body of polymer and diluent from the outer periphery of the cylindrical stream using a special valve. Thereafter, the solvent is removed.

It is not necessary, of course, to carry out a continuous polymerization using a single path system, such as described by Kizer et al., although if it were not for the difficulties of carrying out such a system using alfin polymers, it would definitely be a preferred one. Kizer et al. however, barely touch on the problems involved in converting the polymerization of alfin rubbers to a continuous operation. It is necessary to control not only the flow of the polymer through the system, but also its molecular weight. For this purpose, Kizer et al. add a "short-stopping agent" to arrest the polymerization at the desired stage. Greenberg adds a catalyst deactivator for the same purpose. However, this is a serious complication, since the solvent system must be freed from catalyst deactivator, or else it cannot be reused. The polymer that is recovered must be freed from monomer, low polymer such as dimer, solvent, and also catalyst residues. The catalyst (which is a solid) must be kept in a uniform suspension in the reaction mixture throughout the reaction, if polymerization is to be uniform and controllable. At the same time, yield must be optimized, and this is not easy to do while optimizing the other variables, such as solvent recovery.

A further problem in solvent recovery are the unsaturated impurities that are present in small amounts with many monomers, particularly acetylene and cyclopentadiene. These can poison an alfin catalyst, and tend to accumulate in the solvent unless removed. Because of the small amounts, however, removal by fractionation or like techniques is very difficult.

Accordingly, it is not surprising that when alfin rubbers of relatively low and medium molecular weights, ranging from about 50,000 to about 1,250,000 were provided by Greenberg et al. via U.S. Pats. Nos. 3,067,187 and 3,223,691, all of the preparatory procedures described, were batch procedures. There is a reference in the patent to a continuous process, and it is of course possible to visualize the process as a continuous operation, but in fact no details are given in these patents as to how a continuous process in which monomer and solvent are recovered and recycled could be carried out in practice.

The restriction on molecular weight made possible by incorporation of a molecular weight moderator, a dihydroaromatic compound, with the alfin catalyst during the polymerization, for the first time made possible the production of alfin rubbers that were capable of being processed easily, thus avoiding the alternative techniques previously suggested, such as that of Pfau et al. U.S. Pats. Nos. 2,964,083, granted Dec. 13, 1960, and 3,074,902, granted Jan. 22, 1963, who endeavored to reduce working viscosity of the alfin polymers by the incorporation of liquid plasticizers, particularly petroleum hydrocarbon oil. Accordingly, the Greenberg et al. patents have renewed commercial interest in the alfin rubbers, and a commercial development, of course, requires a process that would make it possible to prepare such rubbers as a continuous operation.

In accordance with the instant invention, a continuous process for the preparation of alfin polymers is provided, comprising continuously blending monomer, alfin catalyst, molecular weight moderator and solvent, continuously effecting the polymerization of the monomer at a temperature at which the reaction proceeds by a alfin catalyst in the presence of the molecular weight moderator, treating reaction mixture with carbon dioxide to convert organometallic compounds such as acetylides and alkali metal cyclopentadiene compounds to the acid salts, continuously separating unreacted monomer, volatile low polymer and solvent from the alfin polymer reaction mixture and dissolving and extracting such acid salts in water, and steam distilling volatile materials from the resulting dispersion, and thereafter recovering solvent and optionally the monomer and recycling them for reuse, and washing and drying the alfin polymer.

The carbon dioxide treatment by converting acetylides and cyclopentadiene metal compounds into acid salts makes it possible to separate these from the solvent, and prevent acetylene and cyclopentadiene which otherwise would be regenerated when their organometal derivatives are brought in contact with water, from being distilled off with the solvent. If this occurs, they can be recycled with the solvent, and can react with and destroy alfin catalyst by being converted again into their alkali metal derivatives. Moreover, with each recycling, and each fresh portion of monomer, the content thereof will be increased, until a substantial loss of catalyst can occur. This is prevented by the carbon dioxide treatment.

The reactions concerned are as follows:

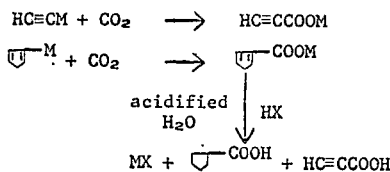

M is an alkali metal, and X is an acid anion, such as halide.

The solvent and low boiling volatiles such as monomer can be separated by various techniques. Prior to contacting the reaction mixture with water, the low volatiles can be flashed at a reduced pressure and elevated temperature, to remove from about 10 to about 99% of such materials, depending on the solids content of the mixture. Residual volatiles including low polymer can be recovered by steam distillation after quenching the reaction mixture in water. This technique permits recovery of nearly all of the monomer (in the case of low boiling monomers such as butadiene and isoprene) with a portion of the solvent during the flashing, and quenches the reaction mixture in water, and recovers substantially all of the volatiles from the resulting dispersion, in part by steam distillation, and in part by vaporization due to the heat of the steam.

In the process of the invention, the molecular weight of the polymer is controlled by adjustment of the proportion of molecular weight moderator. No other modification of reaction conditions, proportions of catalyst, and other process variables is required. A catalyst deactivator and the resultant system contamination complicating recycling of unused materials such as monomer and solvent is thus unnecessary, eliminating a serious obstacle heretofore to realization of a continuous process.

A further feature of the continuous process of the invention is the attainment of any desired Mooney value in the alfin polymer within the range from about 30 to about 110 after the polymerization has achieved about 70% of completion, after which Mooney value does not change appreciably even if the reaction conditions be altered. This enables good control of uniformity of the polymer, and is unlike a batch process. The reason for this is not known, but it permits processing of the alfin polymer without deactivation of the catalyst and without regard to possible alteration in the Mooney value of the polymer. This renders the process extremely attractive for commercial application.

The invention also provides for linking alfin catalyst preparation and the preparation of the sodium dispersion used in preparing the alfin catalyst with the continuous alfin polymer process system, preferably using a common solvent or diluent in all three unit operatives, and recycling solvent and unreacted starting materials. In this way, a fully self-contained system is provided in which the principal raw materials consumed are monomer, molecular weight moderator, alkyl halide and sodium.

FIG. 1 represents a flow diagram showing the sequence of unit operations involved in a typical apparatus for carrying out the process of the invention, and employing a flash step to recover low volatiles.

FIG. 2 represents a flow diagram of another embodiment in which the reaction mixture is quenched with water.

FIG. 3 represents a flow diagram showing still another embodiment of the process, utilizing apparatus for carrying out the washing of the reaction mixture at the conclusion of the polymerization, prior to quenching and solvent recovery.

These unit operations will now be considered in further detail.

ALFIN CATALYST PREPARATION

The linking of the preparation of the sodium slurry used for the alfin catalyst and of the alfin catalyst formation with the alfin polymerization reaction represents an important aspect of the continuous process of the invention, and provides attractive savings in operation. If in addition the same inert diluent or solvent is employed in the three steps, recovery of the diluent or solvent and recycling at the conclusion of the polymerization are possible without a solvent fractionation step. The recycle solvent after monomer removal, and removal of catalyst alcohol and olefin, and water, can simply be recycled to each of these operations from a common line.

A particularly effective alfin catalyst is obtained when the sodium is employed as a finely-divided dispersion in the inert diluent, in which the maximum sodium particle size is about 1 to 10 microns, such as may be prepared on a Gaulin mill. When such finely-divided sodium is used, ordinary stirring devices may be employed, instead of high speed comminuting equipment, in the preparation of the alfin catalyst. Moreover, catalyst activity can be more readily reproduced.

The amount of sodium in the dispersion is not critical, and can be adjusted to suit any alfin catalyst preparatory procedure that is desired. Usually, a sodium concentration within the range from about 2 to about 50% is satisfactory.

The inert diluent that is employed for dispersion of the sodium can be any liquid aliphatic or cycloaliphatic saturated hydrocarbon. The hydrocarbon should be a liquid under the conditions during which the sodium dispersion and the alfin catalyst are formed. This requires that it remain liquid at temperatures as low as −20° C. and below, and at temperatures as high as 25 to 130° C., or higher, whatever is the maximum temperature reached during alfin catalyst formation.

The satisfactory aliphatic hydrocarbon solvents that are also useful in alfin catalyst preparation and in alfin polymer formation include pentane, hexane, heptane, octane, nonane and decane, 2-methylpropane, 2-methylbutane, 2,3-dimethylbutane; 2-methylpentane; 3-methylpentane, 2,2-dimethylpentane; 2,3-dimethylpentane; 2,4-dimethylpentane; 2,2,4-trimethylpentane; 2-methylhexane; 3-methylhexane; 2,4-dimethylhexane; 2,5-dimethylhexane; 2,2,4-trimethylhexane; 2-methylheptane; 3-methylheptane; 2,3 - dimethyloctane; 2 - methylundecane; 2-methyldodecane; 2,2,4-trimethyldodecane, etc., and mixtures thereof. While the examples have been listed with respect to the mono-, di-, and tri-methyl substituted aliphatic hydrocarbons, it should be appreciated that other lower alkyl-substituted hydrocarbons are considered applicable. Other suitable alkyl radicals include ethyl, isopropyl, butyl, etc. Especially suitable, since they are readily obtainable, are odorless mineral spirits, boiling range 349–406° F., commercial mixtures of branched aliphatic hydrocarbons, such as "Isopar E," a material devoid of normal hydrocarbons, which typically has the composition:

| Component: | Weight percent |
|---|---|
| 2,2,4-trimethylpentane | 2.2 |
| 2,5-dimethylhexane | } 4.8 |
| 2,4-dimethylhexane | |
| 2,3,4-trimethylpentane | 11.5 |
| 2,3,3-trimethylpentane | 21.1 |
| 3-methylheptane | 33.0 |
| 2,2,4-trimethylhexane | 6.2 |
| 3-methyl-4-ethylhexane | |
| 3,4-dimethylheptane | |
| 2,3-dimethylheptane | } 5.7 |
| 3,3,4-trimethylhexane | |
| 15 other iso-components | 13.7 |
| $C_9$ naphtha+$C_{10+}$ | 1.8 |
| | 100.0 | the $C_6$ hydrocarbon mixture having the following composition:

| Component | Weight percent | Range percent |
|---|---|---|
| 2-methylpentane | 16.2 | 8–33 |
| 3-methylpentane | 15.3 | 14–19 |
| n-Hexane | 49.1 | 38–61 |
| Methylcyclopentane | 17.1 | 5–18 |
| Cyclohexane | 1.4 | 0.2–2 |
| Benzene | 0.1 | 1 |
| Unknown (including propane, butanes, pentanes and toluene) | 0.2 | 1 |
| Total | 100.0 | 100.0 | and light alkylates which are devoid of n-hydrocarbons, such as Sinclair's "Light Alkylate," which has the following composition:

| Component | Weight percent |
|---|---|
| 2-methylbutane | 10.0 |
| 2,3-dimethylbutane | 8.2 |
| 2,4-dimethylpentane | 5.8 |
| 2,3-dimethylpentane | 7.9 |
| 2,2,4-trimethylpentane | 21.5 |
| 18 other $C_8$ and $C_9$ branched aliphatic hydrocarbons | 46.6 |
| | 100.0 |

Also useful are cycloaliphatic hydrocarbons, such as cyclohexane, cyclopentane, methyl cyclohexane, and cycloheptane.

The sodium dispersion in an inert diluent can be employed in the usual way in any desired preparation of alfin catalyst. Typical preparations of an alfin catalyst have been described in sufficient detail in the Greenberg et al. Patents Nos. 3,067,187 and 3,223,691 and in Hoffman et al. No. 3,317,437, and in the Morton articles supra, so that full details are not required here, and those skilled in the art will know from the following description how to utilize sodium dispersions in accordance with the invention in such preparations.

As the secondary alcohol component, to form the sodium alkoxide, any methyl n-alkyl carbinol having from one to about ten carbon atoms can be used, such as isopropanol, methyl-n-propyl carbinol, and methyl-n-butyl carbinol. Isopropanol is preferred.

The alkoxide will form at rather low temperatures, as low as −20° C. being satisfactory. There is no upper limit on reaction temperature. Consequently, the reaction temperature used is that suitable for metallation of the olefin.

The olefin has from about three to about ten carbon atoms, and should contain the group —CH=CHCH$_2$—. Propylene is preferred, giving allyl sodium, but butene-1, butene-2, pentene-1 and hexene-1 can also be used. Terminal olefins CH$_2$=CH—CH$_2$— are preferred. Activity may decrease as the olefin molecular weight increases.

The alkenyl sodium, sodium halide, and sodium alkoxide composing the alfin catalyst are prepared by reaction of the sodium slurry with the alcohol and the olefin in the presence of the dispersing liquid used for the catalyst. This can be and preferably is the same as the inert diluent used for the sodium dispersion. Frequently, however, if a solvent fractionation step is not inconvenient, a lower-boiling hydrocarbon such as hexane is used, to facilitate separation later. Any inert aliphatic or cycloaliphatic hydrocarbon is satisfactory.

The olefin is metallated by use of an alkyl sodium which is prepared in situ from an alkyl halide having from about three to about ten carbon atoms. Butyl chloride is preferred, but amyl chloride, hexyl chloride, hexyl bromide, heptyl chloride, amyl bromide, and octyl chloride can also be used.

The reaction will proceed at low temperatures, which is advantageous when the olefin is a gas, such as propylene. A temperature from about $-20°$ C. to about $130°$ C. can be employed. From one-half to about five hours' reaction time is normally adequate.

The reaction mixture can be prepared by mixing the catalyst diluent, sodium dispersion and alkyl halide, and then adding the alcohol. After the alkoxide has been formed, the olefin is added, and metallated. Excess olefin may be removed, and the residue can be used as the alfin catalyst, without further treatment or purification. In this method, the sodium is first converted to the alkyl sodium, and half of this is then converted to the alkoxide, while the remainder is converted to alkenyl sodium.

It is also possible to add the alcohol to the sodium dispersion mixed with the catalyst diluent, forming the sodium alkoxide, and then adding the alkyl halide, and, finally, the olefin. This procedure requires half the amount of alkyl halide, and three-quarters the amount of sodium, required by the first procedure, and is therefore preferred in a commercial operation.

THE MOLECULAR WEIGHT MODERATOR

The moderator employed for molecular weight control is a dihydro derivative of an aromatic hydrocarbon, as described in the Greenberg et al. Pat. No. 3,067,187.

The dihydro derivatives of aromatic hydrocarbons as embodied herein include 1,4-dihydrobenzene, 1,4-dihydronaphthalene, 1,2-dihydrobenzene, 1,4-dihydrotoluene, p-1,4-dihydroxylene, allyl benzene, 1-allyl-naphthalene, 1,2-dimethoxy-4-allyl benzene, 1-methoxy-1,4-dihydrobenzene, and 1-ethoxy-1,4-dihydrobenzene; 4-allyl-toluene, 4-allyl anisole, 4-allyl-diphenyl, 1,4-diallyl benzene, chlorobenzene, bromobenzene, iodobenzene, 1-bromonaphthalene, and the like, and mixtures of these. 1,4-dihydrobenzene and 1,4-dihydronaphthalene are preferred.

The amount of moderator controls the molecular weight, and the amount required is dependent upon such factors as the temperature and pressure of the reaction and the quantity and type of diluents employed. In general, it may vary from about 0.1 to about 10%, based on the weight of the monomer, and in the case of the preferred moderators the use of about 0.4 to about 1 percent is preferred.

In the practice of the invention, the process conditions, i.e., temperature, time, catalyst and catalyst concentration, are fixed, and the molecular weight is controlled simply by adjustment of the proportion of molecular weight moderator. Thus, complete molecular weight control is obtained by change in only one variable, and that an easily controlled one. The result is a process that is closely controllable within surprisingly narrow tolerance limits.

Although the mechanism of the action of these moderators in molecular weight control is not yet fully understood, carbon-14 studies have shown that at least one molecule of the moderator is present for each polymer chain, the additional aromatic ring being present presumably as a terminal group. These moderators do not change the ratio of 1,4-trans to 1,2-isomers in the resultant polymers, the ratio in the range of 2 to 3 in normal alfin rubbers being retained.

THE ALFIN MONOMER

The process of the invention can be employed in the alfin polymerization of a wide variety of unsaturated organic compounds, including aliphatic dienes such as 1,3-butadiene, 2,3-dimethyl-1,3-butadiene, isoprene, piperylene, 3-methoxy-1,3-butadiene, aryl olefins, such as styrene, the various alkyl styrenes, p-methoxy-styrene, alpha-methyl-styrene, vinyl naphthalene, and other unsaturated hydrocarbons. 1,3-butadiene alone and combinations of butadiene and styrene and of butadiene and isoprene are preferred polymerizable unsaturated compounds.

THE ALFIN POLYMERIZATION REACTION

Before employing a monomer in accordance with the invention, it is essential that the monomer be prepared for the alfin polymerization by removing any water that may be present and usually at least part if not all of any polymerization inhibitor, particularly any phenols, such as tertiary butyl catechol, since these materials may destroy the alfin catalyst. First, the water is removed from the monomers, such as in a distillation dryer. If the drying tower is operated at 75 p.s.i.g., cooling water may be used for condensation of both the monomers and the water. The water can then be separated from the hydrocarbon monomer layer, which is recycled to the column. The almost dry monomers can be withdrawn from the dryer as a vapor, and condensed again. The monomers are now essentially dry and contain 20 p.p.m. of water or less, together with a few p.p.m. of the inhibitor, tertiary butyl catechol, for example. The monomer can then be withdrawn, leaving behind the inhibitor, which is essentially nonvolatile relative to the monomer, and is ready for feeding to the polymerization reactor system.

The polymerization is effected in the presence of a hydrocarbon diluent or solvent for the monomer, and the alfin rubber, and that is inert in the reaction. Preferred reaction media are inert aliphatic and cycloaliphatic hydrocarbons, such as pentane, hexane, a 1:1 mixture of hexane and pentane, octane, cyclohexane, cyclopentane, cycloheptane, decalin, and heptane. The preferred reaction solvent is the same hydrocarbon employed for the dispersion of sodium in the preparation of the alfin catalysts, such as odorless mineral spirits or ISOPAR E, or commercial hexane or isooctane. Branched chain hydrocarbon solvents tend to give polymers having a lower solution viscosity than straight chain hydrocarbon solvents, and in many cases, consequently, branched chain hydrocarbon solvents are preferred.

The reaction is carried out at an elevated temperature in contrast to the batch-wise type of reaction described in the Greenberg et al. patent, which employs room temperature or below. Whereas in the Greenberg et al. process the reactants are mixed at a very low temperature, of the order of $-10°$ C., all of the streams of reactants, including catalyst, molecular weight moderator and diluent or solvent, are blended in the continuous operation of the invention at a temperature within the range from about 40 to about 200° F., so as to expedite a rapid attainment of the reaction temperature, in order to facilitate heat removal during the initial stages of the reaction.

The polymerization reaction is carried out in a reaction zone, with the blend of reactants continuously entering at one end, and alfin polymer reaction mixture continuously being withdrawn at another end. The rate of transit through the zone is timed to allow polymerization to proceed at least to 70% of completion at the moderator level employed. This usually requires from about two to about five hours. The polymerization temperature is 40° F. or above, up to approximately 200° F., and preferably within the range from about 120 to about 180° F.

The reaction is exothermic, and after the selected reaction temperature is reached, and reaction is proceeding, the reaction temperature should be controlled by removal of heat liberated in the course of the polymerization. For this purpose, effiecient cooling may be needed, with a large surface area exposed to the coolant. The reactors used are provided with coolant systems, such as jackets and cooling coils, through which a coolant can be circulated, such as water.

For more effective control of reaction temperature and hence of the polymerization, a series of reactors can be used. The reactors are operated liquid full, and under pressure, in order to ensure that the reaction is carried out in the liquid phase, in solution or dispersion in the solvent employed. Pressures of from about 1 to about 50 atmospheres are suitable, and higher pressures, up to 300 atmospheres can be used.

Another important feature of the polymerization is the use of a relatively dilute solution of the reactants. In the batch-wise reaction of the Greenberg et al. patent, for example, a 30% butadiene solution is employed in hexane in Example 1, and a 96% yield of polybutadiene was obtained in this system. On the other hand, in the continuous operation of the process, the effluent from the polymerization reaction system should contain a maximum of 25 weight percent of alfin rubber and preferably from about 8 to about 15 weight percent alfin rubber at the reaction temperature, before solvent removal. As little as 5 weight percent alfin rubber is satisfactory and even 2% can be handled, but of course as the solution becomes more dilute the volumes of solvent being cycled become rather large for the weight of polymer being produced, and efficiency goes down. The olefin and/or diene monomer starting material concentration is adjusted accordingly, and is also at most 25 weight percent, and preferably from about 8 to about 15 weight percent.

The amount of alfin catalyst (solids basis) that is employed is normally from about 1 to about 6 weight percent, and preferably from about 1 to about 3.5 weight percent based on the weight of the unsaturated organic compound.

As indicated previously, it is quite important that water be excluded from the alfin polymerization reaction mixture, and consequently it is essential that all components that are employed therein be anhydrous.

The polymerization reaction is carried out under such conditions that approximately 80 to 85% of the diene and/or olefin monomers entering is polymerized. It is not desirable to obtain a maximum polymerization of the olefin and/or diene starting material, unlike a batch-wise operation. Control of molecular weight and hence of Mooney of the polymer is effected by the amount of the molecular weight moderator that is added. The polymerization product is obtained as a solution in the solvent of the alfin rubber, and this solution of the alfin rubber is referred to as alfin rubber cement.

At the conclusion of the polymerization reaction, an antioxidant can be added, as a preservative for the alfin rubber during subsequent processing. A very small amount of the antioxidant will be effective. An amount within the range from about 0.1 to about 5% by weight of the alfin polymer will suffice. As the antioxidant, there can be employed any organic phenol, organic amine, or aminophenol, such as, for example, 2,2'-methylene-bis(4-methyl-6-tertiary-butyl-phenol) or N-phenyl-2-naphthylamine.

The moderator is used in an amount to give the desired molecular weight. It has been determined that after the desired molecular weight is reached in the continuous process of the invention, it is quite unnecessary to arrest the polymerization. The moderator gives sufficient protection. In fact, to add compounds such as ethanol for the purpose is undesirable, because this will contaminate the solvent system, and since it can poison the alfin catalyst it must be removed before the solvent can be recycled.

CARBON DIOXIDE TREATMENT

The purpose of the carbon dioxide treatment is to remove acetylene, cyclopentadiene, and other impurities that are present in the alfin polymer reaction mixture as organosodium compounds. Such compounds undergo carbon dioxide insertion reactions, and are thereby converted into the corresponding acid salts:

$$NAa + CO_2 \rightarrow RCO_2Na$$

R is the organic radical.

The carbonylation reactions proceed at the same temperature at which alfin monomer polymerization proceeds, so carbon dioxide can simply be brought into the reaction mixture at the conclusion of the polymerization. There is no need to change the temperature of the reaction mixture preparatory to carbonylation. Any temperature from 40 to 200° F. can be used.

Since very small amounts of such impurities are present, and the reaction is stoichiometric, mole for mole, it is not necessary to add much carbon dioxide. Usually, from about 0.01 to about 5 weight percent, based on the alfin monomer used, is sufficient. However, an excess does no harm, and may ensure that all of the small amounts of organosodium compounds present are carbonylated.

Carbon dioxide can be added as the gas or as Dry Ice. A carbon dioxide atmosphere cannot be used for the reaction, since it may inactivate the catalyst, and so it is best not to add carbon dioxide until polymerization has proceeded to the desired extent.

Carbon dioxide may also react with sodium sites on the alfin polymer, forming acid salt groups which in water can be converted to acid groups. However, these are present in minor amounts, and do not affect polymer properties deleteriously.

After the carbon dioxide treatment, the solvent and any unreacted monomer are removed. A preliminary flash step can be used, if desired.

FLASH REMOVAL OF ALFIN MONOMER AND SOLVENT

The purpose of the monomer and solvent removal in this step is to recover as much as possible of the monomer and solvent by flashing for reuse, and at the same time concentrate the alfin rubber cement, while retaining a cement of a workable viscosity that can be conveyed to the next operation. Usually, a solution containing 14 weight percent or more of alfin polymer is the objective. Depending on the Mooney value, and the concentration, an alfin polymer may contain as much as 26 to 30 weight percent, polymer and still be cement. It is also necessary to free the solvent solution of any unreacted monomer.

Accordingly, in this embodiment of the process of the invention, monomer and solvent are removed at this stage, by flashing at the conclusion of the polymerization, before the alfin catalyst is hydrolyzed by water. Any acetylenes and cyclopentadiene present are in the form of the sodium acid salts, due to the carbonylation, and consequently remain in the reaction mixture during the flashing.

In the process of the invention, the solvent and monomer are removed by flashing, preferably in several stages. It is more economical to remove the solvent and monomer step-wise, rather than all at once.

In order to effect flash removal of as much of the solvent or diluent as possible, the first step is to bring the reaction mixture, if necessary, to an elevated temperature at or above the flash temperature at the flash pressure, such as atmospheric pressure. This conveniently can be the reaction temperature, in which case no special heating is necessary. In order to remove the solvent or diluent quickly, however, it is desirable to have it at as high a temperature as possible, and it may therefore be desirable to heat the reaction mixture to a higher temperature than the flash temperature.

The flash temperature is the boiling point of the solvent or diluent at a given flash pressure. The maximum flash temperature is the decomposition temperature of the solvent or diluent, or the polymer. Normally, alfin rubbers do not decompose at temperatures up to 225° C., and some are stable up to 275° C. Satisfactory flash temperatures for alfin polymers may range from about 50 to about 275° C., depending upon the polymer and the solvent or diluent.

The pressure that is applied while the mixture is being heated to the flash temperature is sufficient to maintain the solvent in the liquid phase until flashing is desired. The pressure may be upwards of 15 p.s.i., and frequently is in excess of 100 p.s.i. There is no upper limit, but usually 500 p.s.i. is sufficient.

The reaction mixture can be brought to any desired flash temperature under pressure by passing it through a high temperature electric heater or heating coil. A plate or tube type heat exchanger also can be used, if desired.

Flashing is effected in a flash separator, in which the pressure of the reaction mixture is very quickly reduced to a pressure at which the solvent flashes off. Atmospheric pressure can be used, as well as subatmospheric pressures down to as low as about ¼ atmosphere, depending upon the solvent and the temperature of the reaction mixture.

Flashing removes as much as possible of the solvent usually from 10 to 90% or more and appreciable quantities, if not all, of the monomer. The residual solvent is removed by steam distillation, in the presence of water. The use of steam permits removal of all of the solvent and monomer, if a flash step is not desired.

Water washing also extracts the acid salts formed by carbonylation with carbon dioxide. Such salts are not volatile during the flashing, and are retained in the reaction mixture until extracted by water.

FURTHER REMOVAL OF VOLATILES INCLUDING MONOMER AND SOLVENT AND FORMATION OF ALFIN POLYMER CRUMB

In this step, whether or not a flash step is used prior thereto, the alfin polymer is recovered as crumb from the reaction mixture, and any volatile materials are removed by steam stripping and a simultaneous flashing due to the heat of the steam. The operation is carried out continuously in the presence of hot water, and any sodium acetylenic acid salt and sodium cyclopentadienic acid salt being water soluble are extracted into the water phase. Volatile low polymer is also stripped. The alfin catalyst is hydrolyzed, and any olefin and alcohol released therefrom are removed as well, at this stage.

As the first stage in the steam stripping, the alfin polymer solvent solution withdrawn at the end of the polymerization zone is blended with hot water. The water is preferably at a temperature above the steam distillation temperature of the solvent or diluent to be stripped. This temperature will also be above the boiling point of monomer, catalyst alcohol and catalyst olefin. The water is held at this temperature (inasmuch as the alfin polymer reaction solution is continuously being blended therewith in a crumb former or solvent stripper) by injection of steam. Thus, a true steam distillation of the volatiles is obtained in combination with a very rapid flashing of volatiles, due to the heat of the water when the water and reaction solution are blended. The alfin polymer precipitates from the polymer solution as a wet finely divided crumb, and becomes suspended in the water in this form.

The amount of water used is enough to form an alfin polymer crumb suspension containing from about 2 to about 10 weight percent crumb. The maximum crumb content is determined by the handling properties of the suspension.

The alfin polymer reaction solution is blended with the hot water continuously, and the volatiles are continuously drawn off overhead while the alfin rubber crumb that becomes suspended in the water is continuously separated by screening or centrifuging. The solution can be blended with the water at one end of this zone, and the crumb removed at another end. One or several stages can be used, depending on equipment limitations. Conventional crumb formers or solvent strippers as used in the synthetic rubber industry are suitable. To aid in stabilizing the suspension, surface active agent can be added.

The suspension of cement in water simultaneously is subjected to steam stripping. Steam distillation is effected at a temperature within the range from about 50 to about 130° C. as a result of which the suspension can be brought to the boiling point of water. Any volatiles that are not flashed off are steam distilled out.

The steam stripping step is normally carried out under atmospheric pressure. However, it may be desirable to employ sub or super atmospheric pressures, in order to achieve lower or higher stripping temperatures, and good crumb formation.

The time required to remove all volatiles depends to some extent on the amount and type of volatiles and the physical characteristics of the alfin polymer being processed. Usually, from about 2 to about 90 minutes are adequate. For example, an alfin copolymer of butadiene and styrene, containing from about 75 to about 98 weight percent of butadiene, can be recovered from solution in hexane wherein the polymer concentration is about 10%, as an essentially solvent-free rubber crumb, that is, containig less than about 0.5% hexane, by steam stripping at a temperature of from about 200 to about 210° F. for about 3 minutes to a half-hour.

If desired, as an alternative procedure, and especially when flashing is not used, the alfin polymer reaction solution can first be subjected to a continuous water-washing treatment, preferably passing the reaction solution and the wash water countercurrently to each other, thereby removing isopropanol and water-soluble salts, and facilitating the production of a polymer having an extremely low ash content. The washing step is not necessary, in most cases, however. If it is used, it can be carried out by passing the alfin polymer solution and water countercurrently, and passing the wet polymer solution to a separation zone, where the water separates out as an aqueous phase containing water-soluble impurities, leaving the alfin polymer solution. The alfin polymer solution is then passed to the steam stripping zone.

In a variation of the washing step, in order to ensure a substantially complete removal of water-soluble impurities from the polymer-solvent solution, a two stage or plural stage countercurrent washing can be used.

The volatiles overhead, including monomer, solvent, alcohol, olefin, moderator and water, are drawn off together. The solvent is separated from the monomer alcohol and olefin by the usual condensation and fractionation techniques, and recycled to the polymerization stage. The monomer can be recovered and recycled, if desired. All are dried before recycling.

CRUMB SEPARATION AND FINISHING

The purpose of this treatment is to dry the alfin rubber crumb, which at this stage may still contain small amounts of the solvent, molecular weight modifier, and any relatively nonvolatile monomer, such as styrene.

The rubber crumb is first seprated by running the suspension through a screen. The use of cold water as a wash for the crumb cake will cool the crumb, and prevent its sticking to the screen. The water wash may also leach out any residual water-soluble salts present in the crumb. The alfin polymer crumb from the screen may then be brought to an expeller, which by means of screw compression reduces the water content to below 10%. The remaining water and any solvent can be removed by flashing, compressing the rubber in an expander, so as to heat it, and then releasing the pressure suddenly so that water as steam and solvent flash off. The water is separated, and some is recycled, while some is purged, since this wash water contains salts and build up of salts must be avoided. The final product from the expander can be baled, and is ready for distribution and/or use.

THE CONTINUOUS SYSTEM OF FIG. 1

Fig. 1 shows a system in which the continuous process for preparing alfin rubbers in accordance with the invention is carried out in the production of alfin rubbers from butadiene, isoprene and styrene, separately or in any combination.

The synthesis of the alfin catalyst in this system takes place in Zone A. The process shown employs sodium, which is prepared as a dispersion in a liquid diluent at a 25 to 50 weight percent sodium concentration. The sodium dispersion is fed via pump 1 to the storage tank 2 where it is stored under nitrogen. Diluent enters via line 3 and sodium (molten) via line 3 into the mixing tank 5, whence it is circulated via line 7 to a Gaulin mill 8 to reduce the particle size of the sodium, and then back via line 9 to the mixing tank, to provide an intimate dispersion of sodium of a particle size of less than 10 microns average diameter in the diluent. The finished dispersion is bled off continuously via line 10 to one of two storage tanks 11, 12, equipped with agitators to maintain uniformity.

To prepare the alfin catalyst, a batch technique is used. Diluent from storage 14 is charged via line 15 to the catalyst synthesis reactor 16, an agitated vessel equipped with cooling facilities. Sodium dispersion is added via line 15 from tanks 11 or 12, and isopropyl alcohol is gradually added from storage 17, via line 18 with agitation and cooling at a temperature of approximately 0 to 80° C. Since the reaction is exothermic, the alcohol addition is slow. In this way, one-third of the sodium is converted to sodium isopropoxide. The addition of butyl chloride from storage 19 via line 18 then converts most of the remaining sodium in the tank 16 to equimolar quantities of sodium butyl and sodium chloride. This also is an exothermic reaction and cooling is required. The temperature is held within the range from about 0 to about 80° C.

After the addition of butyl chloride is complete, the reaction is allowed to proceed to completion, with agitation. Propylene from storage 20 is then added directly via line 18 to the liquid contents of the vessel. This addition converts sodium butyl to sodium allyl, with the formation of butane as a by-product. Very little heat is evolved at this point, and the reactor is kept under the pressure of the propylene solution. The pressure at this point should be less than 40 p.s.i.g. The contents of the reactor are held at this temperature for several hours, and the pressure then reduced to atmospheric by venting. Butane and excess propylene may be partially removed by heating. The contents then are transferred to one of two catalyst storage tanks 21, 22.

The catalyst preparation can be converted to a continuous operation by providing three catalyst reactors in series, in which each step of the catalyst preparation is carried out in sequence.

Catalyst suspension is supplied to the polymerizers continuously from one of tanks 21, 22 via line 23. The tanks are equipped with agitators to avoid settling of the solids.

The alfin monomer polymerization process takes place in Zone B. The process will be described for preparing a butadiene-isoprene rubber. Monomer feed is prepared for use in the polymerization by removing water and any inhibitor in the strippers 24, 26 from butadiene and isoprene, since these substances destroy catalyst. The preparation of a butadiene-styrene rubber is similar, except that only the butadiene is dried. The dry monomers are fed via lines 25, 33 to the first polymerization reactor 31. Dry moderator is stored in tank 27.

A plurality of polymerizer reactors 31, connected in series, in this case, three, is used. These are each jacketed, and contain cooling coils. The coolant is water, or other suitable liquid. The reaction temperature is within the range from about 100 to 200° F. All polymerizers are operated liquid-full.

The maximum polymerization pressure is that needed to ensure adequate pressure containment in the event of an upset, and also to ensure sufficient pressure for the reactor effluent to flow to the alfin cement blend and feed tanks.

The polymerization is carried out by passing recycle stream 30 consisting essentially of iso-octane and some recycled butane and butadiene to the first of the three polymerizer reactors 31, 31' (only two are shown). Dry moderator from tank 27 and fresh dry monomer in line 33 are mixed with the recycle in the desired proportions and charged together to the polymerizer. Catalyst via line 23 is injected separately. Since the reaction is exothermic, heat must be removed.

The polymerizer effluent from the last reactor, while still at reaction temperature, is then run via line 37 to the carbonation tank 38, where it is carbonylated and also blended with alfin cement to the desired Mooney value, if necessary. Carbon dioxide is admitted via line 38a in the proportion needed, and the mixture held in the tank for a sufficient time to permit carbonylation to become complete. From a few minutes to several hours is adequate.

Carbonylation can also be effected in the concentrator feed tank 39. Carbon dioxide is admitted via line 39a. Also, carbon dioxide can be added to the alfin cement in line 37, and carbonylation then takes place in course of transit in the line and in the tanks 38 or 39.

During normal operation, when product of the proper Mooney is being made, the flow will be directly to the feed tank 39. Blending to the desired Mooney level can be obtained by mixing alfin cement from various storage tanks in the blend tank 38. Both tanks 38 and 39 are kept under carbon dioxide atmosphere. The stirring and agitation therein ensure thorough mixing and complete carbonylation.

Alfin cement of the desired Mooney is charged from the tanks 38 and 39 via line 34 to the first of three flash stages of concentration in Zone C. A first stage heater 32 is provided in the line 34, in the event that the alfin cement stream is below flash temperature. In addition, a spare flash heater servicing the entire concentration system can be provided in a recycle line connected to the flashers.

The concentration system is composed of three flashers 35, 35', 35", and these are operated so that no vaporization takes place in the tubes of the heaters 32, 32', 32". This is effected by maintaining a pressure on the discharge of the heaters greater than the boiling point of the solution, preferably higher than the maximum skin temperature of the tubes. Here, steam condensing at a temperature of 350° F. is used.

The effluent from the first stage heater is at approximately 200 to 275° F., and 50 to 110 p.s.i.g. and flashes in 35 by reduction of pressure to 1 p.s.i.g. The vapor stream is withdrawn through line 46, and the liquid stream is also withdrawn in line 36, and charged to the inlet of the second stage heater 32'. The rubber cement now contains, for example, 9.8 weight percent of alfin rubber. It issues from the heater at approximately 210 to 275° F. and 80 to 100 p.s.i.g. and flows into 35', the second stage flash tank, which is maintained at approximately 1 p.s.i.g. The temperature after flash at this point is approximately 150 to 230° F. The vapor stream is separated and withdrawn via line 46. The liquid from the flash tank 35 containing, for example, approximately 11.5 weight percent of alfin rubber is withdrawn via line 36" and is charged to the third stage heater 32". After these two stages of concentration, most of the butadiene and the isoprene remaining unreacted has been removed as vapor.

The liquid effluent from the third stage heater 32″ at approximately 150 to 275° F. and 60 to 100 p.s.i.g. flows to the third stage flash and surge tank 35″', wherein the liquid flashes upon pressure reduction, and the vapor stream at approximately 180 to 230° F. and 1 p.s.i.g. is withdrawn to line 46. This vessel provides surge capacity for rubber cement of approximately a 15 weight percent alfin rubber concentration. The liquid cement is withdrawn via line 40 and is then charged to the first stage of the crumb formers 41, 41'. Approximately one-half of the total solvent has been removed at this stage by evaporation, and substantially all of the butadiene and isoprene have been recovered.

Alfin cement of the desired Mooney is fed via line 40 to the first of the solvent strippers or crumb formers 41, 41'. Approximately 80–90% of the remaining solvent is removed in the first solvent stripper. The combined vapor stream from the solvent strippers flows to a purification system and is thence recycled.

The crumb formation and finishing operations take place in Zone D. These are the same whether an isoprene or styrene rubber is made. The isoprene rubber case is described.

Rubber cement from flashers, for example, containing approximately 12 to 15 weight percent rubber is continuously charged via line 40 to the first of two solvent strippers 41, 41'. It is mixed with hot recycled water entering via line 47 so that a suspension of alfin cement in water results. If desired, a dilute solution of emulsifying agent from storage 44 can be added via line 45. The resultant mixture enters the first solvent stripper 41, a vessel equipped with a stirrer and overhead collection line 42 running to a condenser. The water is hot enough to flash some of the solvent. Steam and solvent vapors from 41' are injected via line 49c to effect a steam distillation, and heat the mixture to a temperature of about 50 to about 130° C., while the mixture is stirred. Solvent vapors escape via line 42. A slurry of alfin rubber crumb results, and the rubber slurry is removed from below and is sent via line 48 to the second stage solvent stripper 41', which is similar to the first stage. Most of the solvent is removed in the first stage, and the rubber entering the second stage has for example a solvent content of the order of 5 to 10 weight percent, based on the alfin rubber content.

Stripper 41' operates at a temperature of approximately 212° F. Steam is also injected directly into this vessel via lines 49a and b. An aqueous slurry of alfin rubber of the order of 2 to 6 weight percent rubber is withdrawn via line 50. The solvent content of the rubber at this point is of the order of 1 weight percent, based on the alfin rubber.

The product vapor stream in line 42 contains essentially all the hydrocarbons that were present with the exception of the rubber. In addition, it contains propylene, formed by decomposition of the catalyst with water to form sodium hydroxide. It also contains isopropyl alcohol, formed by hydrolysis of the sodium isopropoxide, alone with any excess carbon dioxide. The rubber crumb contains small quantities of the moderator dihydronaphthalene, styrene (if present), as well as a small amount of solvent. The quantity of solvent in the crumb at this stage should be kept to a minimum by appropriate adjustment of the steam stripping conditions.

The slurry from line 50 enters a separator 51 equipped with a mechanical rake 52, so that rubber crumb which floats to the surface of this vessel can be skimmed off. The water in the lower portion of this vessel, relatively free of rubber crumb, is recycled to stripper 41 via lines 53, 54, 47. In addition, to prevent buildup of salts, a proportion is purged, and replaced by make-up water which enters at line 54.

The rubber crumb which is present in the form of small particles and contains substantial water and which is raked out enters a dewatering screen separator 55 via a chute 56. In the chute, the rubber crumb is contacted with a stream of cold water which cools the crumb. The underflow from the screen consists essentially of water containing a small amount of rubber fines, and is withdrawn and pumped to a secondary fines settler 58. Rubber crumb is allowed to overflow from the upper portion of this vessel, and passes via line 59 back on to the screen separator 55. The underflow consists of water containing dissolved salts, and is purged.

The alfin rubber crumb discharged from the separator 55 is fed by conveyor 60 to an expeller 61. The expeller by means of screw compression reduces the water content to approximately 9 weight percent. The water discharged from the expeller is returned to the fines settler 58 via line 62. The rubber from the expeller passes through line 63 and enters an expander 64. Here, by compression, and jacket-heating, the rubber is heated, so that upon discharge water as steam and solvent flash off. A stream of hot purge air to carry away water vapors and any solvent to prevent condensation in the crumb is provided by blowers 65. The alfin rubber at this point in the form of crumb is conveyed to a crumb conveyor and cooler 66 and subsequently to a baler 67 where it can be packaged in 75 pound bales. These are conveyed via conveyor 69 to storage. The solvent and other volatiles removed at the expander are vented.

The solvent recovery and purification system shown in Zone E is designed to (1) recover solvent and optionally monomer and (2) to purge the system of essentially all the alcohol and part of the butane and propylene.

Solvent and monomer vapors in line 46 are condensed in the condenser 75, and a portion of the butane, propylene, along with some butadiene distilled in the light ends tower 76 and removed as an overhead stream via line 77. The dry liquid bottoms, consisting of solvent and most of the monomers, is recycled via line 30 to solvent storage 73, and thence via line 74 to the polymerizers.

Wet solvent vapors in line 42, along with isopropyl alcohol and propylene, are condensed in condenser 80, decanted in decanter 81, and the alcohol-water layer removed at the bottom of the decanter via line 82. The wet liquid hydrocarbon layer is sent to the butylene removal tower 83, where the propylene, water, and remaining isopropyl alcohol are removed overhead in line 84 by distillation. The bottoms are sent via line 85 to a heavy ends tower 86 wherein wet purified solvent is taken overhead in line 87 and recycled to the process via dryer 71 and line 30. The bottoms (the heavy ends) are rejected. If styrene is present, it can be recovered from the heavy ends.

THE CONTINUOUS SYSTEM OF FIG. 2

FIG. 2 shows a modified system in which the flash step is omitted.

The synthetis of the alfin catalyst in this system takes place in Zone A. The process shown employs sodium, which is prepared as a dispersion in a liquid diluent at a 25 to 50 weight percent sodium concentration. The molten sodium is fed via pump 101 to the storage tank 102 where it is stored under nitrogen. Diluent enters via line 103 and sodium (molten) via line 104 into the mixing tank 105, whence it is circulated via line 107 to a Gaulin mill 108 to reduce the particle size of the sodium, and then back via line 109 to the mixing tank, to provide an intimate dispersion of sodium of a particle size of less than 10 microns average diameter in the diluent. The finished dispersion is bled off continuously via line 110 to one of two storage tanks 111, 112, equipped with agitators to maintain uniformity.

To prepare the alfin catalyst, a batch technique is used. Diluent from storage 114 is charged via line 115 to the catalyst synthesis reactor 116, an agitated vessel equipped with cooling facilities. Sodium dispersion is added via line 115 from tanks 111 or 112, and isopropyl alcohol is gradually added from storage 117, via line 118 with agitation and cooling at a temperature of approximately 0 to 80° C. Since the reaction is exothermic, the alcohol addition is slow. In this way, one-third of the sodium is converted to sodium isopropoxide. The addition of butyl chloride from storage 119 via line 118 then converts most of the remaining sodium in the tank 116 to equimolar quantities of sodium butyl and sodium chloride. This also is an exothermic reaction and cooling is required. The temperature is held within the range from about 0 to about 80° C.

After the addition of butyl chloride is complete, the reaction is allowed to proceed to completion, with agitation. Propylene from storage 120 is then added directly via line 118 to the liquid contents of the vessel. This addition converts sodium butyl to sodium allyl, with the formation of butane as a by-product. Very little heat is evolved at this point, and the reactor is kept under the pressure of the propylene solution. The pressure at this point should be less than 40 p.s.i.g. The contents of the reactor are held at this temperature for several hours, and the pressure then reduced to atmospheric by venting. Butane and excess propylene may be partially removed by heating. The contents than are transferred to one of two catalyst storage tanks 121, 122. Each storage tank holds approximately a one day supply of catalyst for use in the continuous process of the invention.

The catalyst preparation can be converted to a continuous operation by providing three catalyst reactors in series, in which each step of the catalyst preparation is carried out in sequence.

Catalyst suspension is supplied to the polymerizers continuously from one of tanks 121, 122 via line 123. The tanks are equipped with agitators to avoid settling of the solids.

The alfin monomer polymerization process taks place in Zone B. The process will be described for preparing a butadiene-isoprene rubber. Monomer feed is prepared for use in the polymerization by removing water and any inhibitor in the strippers 124, 126 from butadiene and isoprene, since these substances destroy catalyst. The preparation of a butadiene-styrene rubber is similar, except that only the butadiene is dried. The dry monomers are fed via lines 125, 133 to the first polymerization reactor 131. Dry moderator is stored in tank 127.

A plurality of polymerizer reactors 131, connected in series, in this case, three, is normally used. These are each jacketed, and contain cooling coils. The coolant is water, or other suitable liquid. The reaction temperature is within the range from about 100 to 200° F. All polymerizers are operated liquid full.

The maximum polymerization pressure is that needed to ensure adequate pressure containment in the event of an upset, and also to ensure sufficient pressure for the reactor effluent to flow to the alfin cement blend and feed tanks.

The polymerization is carried out by passing recycle stream 130 consisting essentially of iso-octane and some recycled butane and butadiene to the first of the three polymerizer reactors 131, 131' (only two are shown). Dry moderator from tank 127 and fresh dry monomer via line 133 are mixed with the recycle in the desired proportions and charged together to the polymerizer. Catalyst is rejected separately through pipe 123. Since the reaction is exothermic, heat must be removed.

The polymerizer effluent from the last reactor 131 while still at reaction temperature flows via line 137 to either the alfin cement blend tank 138 or to the concentrator feed tank 139.

During normal operation, when product of the proper Mooney is being made, the flow will be directly to the feed tank 139. Blending to the desired Mooney level can be obtained by mixing alfin cement from various storage tanks in the blend tank 138.

Carbonylation is effected at this temperature in either of tanks 138 and 139. Carbon dioxide is admitted via lines 138a and 139a, and both tanks are kept under a carbon dioxide atmosphere, with thorough mixing to ensure complete carbonylation.

Alfin cement of the desired Mooney is fed via line 140 to the first solvent strippers or crumb formers 141, 141'. Approximately 95% of the total solvent is removed in the first solvent stripper, and substantially all of the residual unreacted butadiene and isoprene are recovered. The combined vapor stream from the solvent strippers flows to a condenser and purification system in Zone D ad the solvent is recycled.

The crumb formation and finishing operations take place in Zone C. These are the same whether an isoprene or styrene rubber is made. The isoprene rubber case is described.

Rubber cement for example containing approximately 8 to 25 weight percent rubber is continuously charged to the first of two solvent strippers 141, 141'. It is mixed with hot recycled water entering via line 147 so that a suspension of alfin cement in water results with the acid salts present from the carbonylation being extracted into the water. If desired, a dilute solution of emulsifying agent from storage 144 can be added via line 145. The resultant mixture enters the solvent stripper 141, a vessel equipped with a stirrer and overheated collection line 142 running to a condenser 143. The water is hot enough to flash some of the solvent. Steam and solvent vapors are injected from 141' via line 149c to effect a steam distillation, and heating the mixture to a temperature of about 205° F., while the mixture is stirred. Solvent vapors escape via line 142. A slurry of alfin rubber crumb results, and the rubber slurry is removed from below via line 148 and is sent to the second stage solvent stripper 141', which is similar to the first stage. Most of the solvent is removed in the first stage, and the rubber entering the second stage has for example a solvent content of the order of 5 to 10 weight percent, based on the alfin rubber content.

The product vapor stream in line 142 contains essentially all the hydrocarbons that were present with the exception of the acetylenes, cyclopentadiene, and rubber. In addition, it contains propylene, formed by decomposition of the catalyst with water to form sodium hydroxide. It also contains isopropyl alcohol, formed by hydrolysis of the sodium isopropoxide, along with any excess carbon dioxide used. The rubber crumb contains small quantities of the moderator dihydronaphthalene, styrene (if present), as well as a small amount of solvent. The quantity of solvent in the crumb at this stage should be kept to a minimum by appropriate adjustment of the steam stripping conditions.

The slurry from line 150 enters a separator 151 equipped with a mechanical rake 152, so that rubber crumb which floats to the surface of this vessel can be skimmed off. The water in the lower portion of this vessel, relatively free of rubber crumb, is recycled to stripper 141 via line 147. In addition, to prevent buildup of salts, a proportion is purged, and replaced by make-up water which enters at line 154.

The rubber crumb which is present in the form of small particles and contains substantial water and which is raked out enters a dewatering screen separator 155 via a chute 156. In the chute, the rubber crumb is contacted with a stream of cold water which cools the crumb. The underflow from the screen consists essentially of water containing a small amount of rubber fines, and is withdrawn and pumped to a secondary fines settler 158. Rubber crumb is allowed to overflow from the upper portion of this vessel, and passes via line 159 back on to the screen separator 155. The underflow consists of water containing dissolved salts, and is purged.

The alfin rubber crumb discharged from the separator 155 is fed by conveyor 160 to an expeller 161. The expeller by means of screw compression reduces the water content to approximately 9 weight percent. The water discharged from the expeller is returned to the fines settler 158, via line 162. The rubber from the expeller passes through line 163 and enters an expander 164. Here, by compression, and jacket-heating, the rubber is heated, so that upon discharge water as steam and solvent flash off. A stream of hot purge air to carry away water vapors and any solvent to prevent condensation in the crumb is provided by blowers 165. The alfin rubber at this point in the form of crumb is conveyed to a crumb conveyor and cooler 166 and subsequently to a baler 167 where it can be packaged in 75 pound bales. These are conveyed via conveyer 169 to storage. The solvent and other volatiles removed at the expander are vented.

The solvent recovery and purification system shown on Zone D is designed to (1) recover solvent and optionally monomer and (2) to purge the system of essentially all the alcohol and of part of the butane and propylene.

The wet solvent vapors in line 142 are condensed in condenser 143, flowed to a decanter 170, from which the alcohol-water layer is removed at the bottom, via line 171, and the upper organic layer is charged via line 174 to a fractionator tower 175 wherein everything except a small portion of the solvent and heavy ends are taken overhead via line 176. The overhead is condensed, in condenser 177, and run to decanter 178 where the water layer is removed by decantation along with most of the alcohol, which is dissolved in the water. The organic layer, consisting of solvent, unreacted monomers, propylene, butane, and some alcohol, along with a small quantity of $CO_2$ is charged to washing tower 179, and washed with alkaline water to remove $CO_2$ and isopropyl alcohol, which are separated, and the bottom water layer purged. The organic layer after decantation of the water consists of butanes, propylene, and volatile monomers. This is run via line 180 to the tower 181. The overhead is monomer, butane and propylene. Part of this is purged, and the remainder recycled via line 182 to dryer 183, and thence to line 130 and solvent storage 173. The liquid bottoms from tower 181 are monomer and solvent, and are recycled directly to line 130 via line 182.

The bottoms from the tower 175 are charged via line 184 to another distillation column 185 wherein pure solvent is taken overhead via line 186, condensed in condenser 188, and recycled via line 182 to dryer 183. The heavy ends, along with any light polymer, are removed from the bottom via line 187, and rejected.

Styrene if present can be recovered from the heavy ends by distillation.

The equipment described can be designed to produce any type of alfin rubber, such as a butadiene isoprene copolymer, or a butadiene styrene copolymer. The butadiene isoprene copolymer can be approximately 80 butadiene and 20 weight percent isoprene. The styrene rubber can be approximately 85% butadiene, and 15 weight percent styrene. The rubber has a 30 to 110 Mooney range.

THE CONTINUOUS SYSTEM OF FIGURE 3

In the apparatus of FIG. 3, alfin catalyst in the form of a solvent slurry, e.g. isooctane slurry, is passed from catalyst feed tank 210 through pump 212 and line 214 to below the surface of the liquid in reactor 216, first of a group of four reactors 216, 227, 228 each equipped with a stirrer 217. Simultaneously with the addition of the catalyst to reactor 216, butadiene is distilled from tank 211 through a molecular sieve drier 213 and thence condensed in condenser 215, and passed into line 218 leading to the mixing tank 219. Simultaneously with this addition, there are also introduced into the mixing tank 219 a molecular weight moderator, e.g., 1,4-dihydronaphthalene from feed tank 220 through line 221, isoprene or styrene from feed tank 230 through line 232, and isooctane solvent from tank 222 via drier 223 through line 234. In the case of all feeds to tank 219, there are provided in the feed lines Rotameters 224 to regulate the feed rate of each component, thus making adjustable the monomer ratio, the molecular weight of the polymer formed and the concentration of polymer in solution.

Reference numeral 240 denotes the jacket surrounding each reactor through which water or other coolant may be circulated to maintain the reaction temperature, preferably at about 120 to about 180° F., although higher or lower temperatures, e.g. 40 to 200° F., can be used.

Reaction mixture composed of solvent (isooctane), unreacted monomers, and moderator is passed by gravity from tank 219 through overflow pipe 242 to the first reactor 216, where catalyst is added and polymerization begins. The reaction mixture passes through overflow pipe 248 to a second reactor 226, thence via line 249 to the third reactor 227, and thence via line 250 to the fourth reactor 228. Four reactors are utilized herein to provide adequate retention time for the polymerization process, and control heat liberated during the reaction. The first three reactors are run liquid full.

If desired, the process could be conducted in a single reactor, designed to give the desired retention time, although it is believed preferable to utilize at least two reactors, to provide for effective heat removal, to permit more complete reaction, and to obviate the need for recovering unreacted monomers.

The stirrers 217 preferably are of the variable speed, turbine type, whereby speed may be adjusted to give good agitation consistent with the viscosity of the polymer.

Retention time in the four reactors shown may vary considerably, depending upon the nature of the desired polymer. In many cases it has been found that retention time in each reactor of thirty minutes to one hour is entirely suitable, although retention time may be extended to as much as six to eight hours per reactor.

Alfin polymer solution while still at reaction temperature is withdrawn from the bottom of the last reactor 228 and is fed by pump 254 driven by a variable speed motor (not shown) through line 256 to one of two carbonylation tanks 257. Carbon dioxide is admitted via line 258 and thoroughly blended with the reaction mixture, which is given a residence time of from a few minutes to 3 hours in passing through the tank. This permits carbonylation to proceed to completion. The carbonylated reaction mixture is then washed to remove the resulting acid salts and other water-soluble impurities, such as catalyst alcohol, and other salts.

The carbonylated mixture passes via line 259 to centrifugal wash pump 262, which is employed for the washing operation. Water to be utilized to remove water-soluble salts, isopropanol, and other impurities from the polymer solution is passed through line 261 and a heat exchanger 260 to line 259 from which it enters the centrifugal wash pump 262 together with polymer solution from the reactors. The temperature of the water and organic streams may vary over a considerable range, e.g. from 32° F. up to the boiling point of the mixture depending upon the system pressure. However, a system temperature of 120 to 150° F. is preferred. In centrifugal wash pump 262 a temporary emulsion of the water and organic phases is formed, and thence passed through line 264 to a decanter 266 where the heavier water phase containing the water-soluble salts, isopropanol, and other impurities is discharged to waste through line 268, while the lighter organic phase containing the salt-free product is discharged through line 270 to one of two product solution surge tanks 272. This process of washing the organic phase with water to remove alcohol and salts may be repeated as often as is necessary. Numeral 263 denotes a recirculation conduit for recirculating aqueous and organic liquid through the centrifugal wash pump 262. If desired, antioxidant may be added to the product at this stage in the operation through line 274.

From surge tanks 272 the ploymer solution is fed by pump 276 through line 278 to a solvent stripper 280.

Hot water and steam are passed into the solvent stripper 280 through lines 282 and 284, respectively. The operation of the solvent stripper is such as to result in continuous vaporization of the solvent by mixing of the polymer solution in hot water while simultaneously steam-distilling the solvent, thereby forming a slurry of the polymer crumb in water. In the embodiment shown, the polymer crumb overflows at the liquid operating level of the solvent stripper 280, which may be adjusted to provide the retention time required to completely remove the solvent. The crumb is withdrawn through overflow pipe 288 to a screening operation.

The crumb-water slurry passing through overflow pipe 288 is sent to product screen tank 290 into which wash water is also passed through line 292. The water is withdrawn from tank 290 via line 296, and part is recycled to the solvent stripper 280 and part is purged. The washed polymer crumb is removed from the screen tank 290, and may then be passed through subsequent stages such as drying, milling and packaging.

The amount of solvent used in the process of the invention is considerable, and obviously such quantity of solvent cannot be lost and still maintain an economically feasible operation. Accordingly, solvent distilled from solvent stripper 280 and containing water is passed through line 300 and condenser 302 to the solvent-water separator 304. In this separator the heavier water phase along with any residual isopropyl alcohol settles to the bottom and is passed through line 308 to waste, while the solvent liquid is passed through line 310 to storage tank 312 and thence fed by pump 314 to a distillation drying column 316.

The light ends (propylene, butane, butadiene, isoprene and some solvent) are withdrawn overhead via line 320 to a condenser 321, where they are partially liquefied. These light ends can be partially condensed so that the liquid contains most of the monomers and these monomers recycled after drying. A portion is purged to get rid of propylene and butane. The liquid is run into decanter 323, where the water is separated, and the liquid is returned via line 324 to the column 316. The solvent liquid is withdrawn at the bottom of the column via line 305 and pump 307 to the heavy ends removal column 313.

The heavy ends are withdrawn at the bottom of the column, and styrene if present may be recovered by distillation and recycled; the remainder is discarded. The dry light solvent ends are condensed in condenser 315 and thence led via line 317 to the dry solvent storage tank 318, after which they are recycled to the solvent feed tank 222 via line 325.

The washing system provides a simple, efficient and highly flexible process for removing water-soluble components from the organic streams encountered in the continuous alfin polymerization process of this invention. Obviously, where the end use of a polymer is such as not to require substantial absence of ash, the entire washing operation may be omitted from the process, and polymer solution passed directly from the reactors to the desolventizing operation.

The washing method of this invention achieves intimate contact of the organic polymer phase with the aqueous phase by feeding of the organic polymer phase and the aqueous phase into a central zone from which the streams are centrifugally impelled radially outwardly at high speed against a peripheral colection zone surrounding the said central zone. The streams are thus converted to an emulsion by the violent radially impelling force and then delivered as a single stream to a discharge zone, and divided into two portions, one of which is recirculated to the central zone for further mixing with fresh feed, while the other portion in emulsion form is passed to a decanting area for separation in the manner described above.

Water is conserved by providing for two or more of the just described washing systems in series. In this embodiment the emulsion formed by the radially impelling force in a first zone is divided into two streams, one of which is recirculated to the central zone for further mixing. The second stream is decanted and the partially washed organic phase is used as the feed for a second stage operation to be intimately contacted with fresh water. The decanted aqueous phase from this second stage is used as the wash liquid for crude organic phase in the first stage.

In contrast to the prior art polymer washing methods using stirred-tank washing means and requiring mixing periods of one-half hour to several hours, the instant washing method requires a mixing time on the order of seconds. Moreover, in many cases, the present washing method obviates the need for catalyst deactivation, polymer precipitation and the addition of emulsion-breaking agents before decantation, which steps are generally required in prior art methods.

The following experiments confirm the removal of acetylene and cyclopentadiene by reaction with $CO_2$ in accordance with the invention.

Example A

A polymerization was carried out wherein 30 g. of an 85/15 mixture of butadiene-styrene monomer was polymerized in 150 cc. of clear petroleum alkylate solvent. Before adding the alfin catalyst, 18.1 milliequivalents of acetylenes were added as equal molar quantities of ethyl, vinyl, and methyl acetylenes. Alfin catalyst was then added, and the polymerization was carried out at 40° C. for two hours. The polymerization reaction then was short-stopped by adding 90% of the amount of carbon dioxide theoretically required to neutralize the total alkali (RNa+RONa) added in the form of alfin catalyst. The solvent from an aliquot of the alfin polymer cement was distilled from the polymer in a closed system in a vacuum after hydrolyzing with 1 g. of alcohol, the latter to hydrolyze any uncarbonated RNa. The solvent so isolated was then analyzed for acetylenes. Only 2.74 milliequivalents of acetylenes were found in the solvent. Hence, approximately 85% of the acetylenes had been fixed by the carbon dioxide treatment.

This indicates that a slight excess above the theoretical amount of carbon dioxide should be used to effect substantially complete fixation of the acetylenes as the sodium salt of acetylenic acid.

Example B

A similar polymerization experiment was performed wherein a 30 g. of 85/15 butadiene-styrene monomers mixture was polymerized to an 89.8% conversion in the presence of a total of 10.0 meq. of cyclopentadiene. The polymerization reaction was short-stopped with 90% of the theoretical $CO_2$ needed to neutralize the total alkali (RNa+RONa) added in the form of alfin catalyst. The solvent from an aliquot of the alfin polymer cement was distilled from the polymer in a closed system in a vacuum after hydrolyzing with 1 gm. of alcohol, the latter to hydrolyze any uncarbonated RNa. The solvent so isolated was analyzed for cyclopentadiene. Calculated back to the whole simple, the uncombined (by $CO_2$) cyclopentadiene amounted to 4.3 meq. This represents a 57% fixation of cyclopentadiene by $CO_2$ in the alfin polymer reaction mixture, when the latter is added to within 90% of complete carbonylation of the cyclopentadiene.

This indicates that a slight excess above the theoretical amount of $CO_2$ should be used to effect substantially complete fixation of the cyclopentadiene as the sodium salt of cyclopentadienic acid.

The following examples in the opinion of the inventors represent preferred embodiments of their invention.

Example 1

A butadiene-isoprene copolymer can be prepared in accordance with the following procedure, using the apparatus of FIG. 1.

Liquid sodium (194 lbs.) at approximately 250° F. is charged to the sodium dispersion preparation tank 5, and 510 pounds of isooctane run in from storage 14 via line 3 under sufficient pressure to ensure the existence of the diluent as a liquid, whereupon the sodium is dispersed therein at 240° F. via the Gaulin mill 8 to form a uniform dispersion.

An alfin catalyst is prepared by charging 2100 pounds isooctane to the catalyst synthesis reactor 16, after which 510 pounds of the sodium dispersion and 120 pounds of isopropyl alcohol are added with agitation and cooling to maintain approximately 150° F. The alcohol is added over a three hour period. Approximately one-third of the sodium is thereby converted to sodium isopropoxide. Then, over a five hour period 190 pounds of butyl chloride is added, converting most of the remaining sodium to approximately equimolar quantities of sodium butyl and sodium chloride. After addition of the butyl chloride is complete, the reaction is completed by stirring for a further hour.

Next, 95 pounds of propylene is added, converting sodium butyl to sodium alyl, with the formation of butane as a byproduct. This is retained in the system.

Catalyst slurry thus prepared is fed to the first polymerizer reactor 31 via line 23 at a rate of 130 pounds per hour. Dry butadiene is charged continuously via line 33 at a rate of 480 pounds per hour, and dry isoprene via line 33 at a rate of 120 pounds per hour. 1,4-dihydronaphthalene as a dilute solution is added as a moderator at a rate of 25 pounds per hour for the total solution. Approximately 6,450 pounds per hour of a stream consisting of mostly isooctane with substantial quantities of recovered monomers is added. All of the streams are fed in at approximately 150° F.

The three polymerizers 31, 31' are operated liquid full and cooled by water at 85° F., so as to maintain a reaction temperature of 150 to 160° F. The pressure in the polymerizers is 50 p.s.i.g. The reaction mixture is fed in sequence from polymerizer to polymerizer, and the total travel and reaction time through the entire series is about three hours.

The polymerizer effluent in line 37 contains about 8 weight percent alfin rubber at 150° F., and is fed at a rate of 22 gallons per minute to the carbonation and feed tank 39, where carbon dioxide is admitted at a rate of 35 cu. ft./hour, beneath the surface of the liquid in the tank. Residence time in the tank is about ¼ hour, and the temperature of the reaction mixture is about 100–150° F. Effluent reaction mixture is fed at a rate of 22 gallons per minute through line 34 to the flash concentrators. This amounts to 7,209 pounds per hour. The effluent from the heater 32 is at approximately 270° F. and 200 p.s.i.g. and is flashed in the first flasher 35 by reduction in pressure to 1 p.s.i.g. Monomer and solvent vapors are withdrawn from the flasher 35 at the top via line 46, and the liquid is withdrawn via line 36 and charged to the second stage heater 32'. This stream contains approximately 11 weight percent alfin rubber, and is fed from the heater at 275° F. and 200 p.s.i.g. via line 36' into the second flash tank 35' maintained at approximately 1 p.s.i.g. The temperature after flashing is approximately 215° F. The vapor stream is separated overhead into line 46. The effluent is withdrawn via the line 40. The solvent and monomer vapors in line 46 are run into the condenser and fractionator system for recycling after purification.

The polymerizer effluent in line 40 contains approximately 15 weight percent alfin rubber at 215° F., and to this is added 108 lbs./hr. of an antioxidant solution. This is fed at a rate of 3,785 pounds per hour to the first solvent stripper 41, where it is blended with hot water. Steam and hydrocarbon vapors from 41' are injected to heat the suspension to a temperature of 212° F. while the mixture is intensity agitated. The isooctane flashes off, together with isopropanol, and propylene. Sodium acetylenate and sodium cyclopentadiene as the acid salts are extracted into the water phase. The vapor stream in line 42 amounts to approximately 8,500 pounds per hour. Isooctane, butadiene, and isoprene are dried, condensed and purified in the solvent recovery system in Zone E, and recycled. Butadiene dimer is also removed, and is purged.

An 8 weight percent rubber crumb in water results, and is drawn off at the bottom of the stripper via line 48, and is sent to the second stage solvent stripper or crumb former 41', where the steam distillation is repeated. The solvent content of the crumb charged to this stage is approximately 10 weight percent, based on the rubber content. The aqueous slurry of rubber emerging from this crumb former has the solvent content reduced to 1 weight percent based upon the rubber content. The vapor stream in line 42 contains essentially all of the hydrocarbons originally present with the crumb, and in addition propylene and isopropyl alcohol formed by hydrolysis of the catalyst. The rubber crumb contains only small amounts of molecular weight moderator and solvent.

The crumb slurry from the solvent stripper 41' passes through the screen separator 52, removing rubber crumb, which floats to the surface of the vessel. The liquid in the lower portion is recycled to the first crumb former 41.

The rubber crumb in the form of small particles containing approximately 60 weight percent water is raked off, and enters the dewatering screen 56, where it is contacted with a stream of cold water at a rate of approximately 13 gallons per minute. This cools the crumb. The underflow, consisting of water and a small amount of rubber fines, is pumped to the fines settler 55, where the rubber crumb overflows from the upper portion of the vessel back on to the screen 56. The underflow is purged. The rubber crumb discharged from the screen is fed by the conveyor 60 to the expeller 61, which reduces the water content by screw compression from 60% to approximately 9%. The rubber crumb then enters the expander 64 where, by compression, the rubber is heated to approximately 300° F., so that upon discharge from the expander, water as steam and solvent flashes off. The product is then baled in the baler 67, and is ready for distribution.

Example 2

A butadiene-isoprene copolymer can be prepared in accordance with the following procedure, using the apparatus shown in FIG. 2.

Liquid sodium (194 lbs.) at approximately 240° F. is charged to the sodium dispersion preparation tank 105, and 510 pounds of isooctane run in from storage 114 via line 103 under a pressure of 35 p.s.i.g., whereupon the sodium is dispersed therein at 240° F. via the Gaulin mill 108 to form a uniform dispersion.

An alfin catalyst is prepared by charging 2100 pounds isooctane to the catalyst synthesis reactor 116, after which 510 pounds of the sodium dispersion and 120 pounds of isopropyl alcohol are added with agitation and cooling to maintain approximately 150° F. The alcohol is added over a three hour period. One-third of the sodium is thereby converted to sodium isopropoxide. Then, over a five hour period 190 pounds of butyl chloride is added, converting most of the remaining sodium to equimolar quantities of sodium butyl and sodium chloride. After addition of the butyl chloride is complete, the reaction is completed by stirring for a further hour.

Next, 95 pounds of propylene is added, converting sodium butyl to sodium allyl, with the formation of butane as a byproduct. This is retained in the system.

Catalyst slurry thus prepared is fed to the first reactor 131 via line 123 at a rate of 130 pounds per hour. Dry butadiene is charged continuously via lines 124, 133 at a rate of 480 pounds per hour, and dry isoprene via lines 126, 133 amounting to 120 pounds per hour. 1,4-dihydronaphthalene is added as a moderator at a rate of 3.5 pounds per hour, and isooctane is added at a rate of 4260 pounds per hour. All of the streams are fed in at approximately 100° F.

The six reactors 131, 131' are cooled by water at 85° F., so as to maintain a reaction temperature of 150 to 160° F. in each of the reactors, which are operated liquid full. The pressure in the reactors is 50 p.s.i.g. The reaction mixture is fed in sequence from reactor to reactor, and the total travel and reaction time through the entire series is about three hours.

The polymerizer effluent in line 140 contains about 12 weight percent alfin rubber at 150° F., and is fed at a rate of 15 gallons per minute to the carbonation-equipped feed tank 139, where it is carbonylated with carbon dioxide, admitted at a rate of 31 cu. ft. per hour. Residence time is about one hour.

The carbonylated mixture is fed at a rate of 5,000 pounds per hour to the first solvent stripper 141, where it is blended with hot water at 190° F. The water-soluble salts are extracted into the water. Steam and hydrocarbon vapor from 141' are injected to heat the suspension to a temperature of 212° F., while the mixture is intensely agitated. The isooctane flashes off, together with butadiene, isoprene, isopropanol, and propylene. Approximately 98% of the total solvent is removed in the first stripper. The vapor streams in line 142 amount to approximately 12,000 pounds per hour. Isooctane and butadiene and isoprene are dried, condensed, separated in the solvent recovery system in Zone D, and recycled. Butadiene dimer is removed in the heavy ends column 185 and is purged.

A 5 weight percent rubber crumb in water results, and is drawn off at the bottom of the stripper 141 via line 148, and sent to the second stage solvent stripper or crumb former 141', where the steam distillation is repeated. The solvent content of the crumb at the beginning of this stage is approximately 10 weight percent, based on the rubber content. The aqueous slurry of rubber emerging from this crumb former has the solvent content reduced to 1 weight percent based upon the rubber content. The vapor stream in line 142 contains essentially all of the hydrocarbons originally present with the crumb, except the acetylenes and cyclopentadiene, and in addition propylene and isopropyl alcohol formed by hydrolysis of the catalyst. The rubber crumb contains only small amounts of molecular weight moderator and solvent.

The crumb slurry from the solvent stripper 141' passes through the screen separator 152, removing rubber crumb which floats to the surface of the vessel. The liquid in the lower portion is recycled to the first crumb former 141.

The rubber crumb in the form of small particles containing approximately 60 weight percent water is raked off, and enters the dewatering screen 156, where it is contacted with a stream of cold water at a rate of approximately 13 gallons per minute. This cools the crumb, prevents clogging of the screen, and reduces salt content. The underflow, consisting of water and a small amount of rubber fines, is pumped to the fines settler 155, where the rubber crumb overflows from the upper portion of the vessel back on to the screen 156. The underflow is purged. The rubber crumb discharged from the screen is fed by the conveyor 160 to the expeller 161, which reduces the water content by screw compression from 60% to approximately 9%. The rubber crumb then enters the expander 164 where, by compression at elevated pressures, the rubber is heated to approximately 300° F., so that upon discharge from the expander, water as steam and solvent flash off. The product is then baled in the baler 167, and is ready for distribution.

Having regard to the foregoing disclosure, the following is claimed as the inventive and patentable embodiments thereof:

1. In the continuous process for the preparation of alfin polymers from alfin monomers which comprises continuously blending an organic unsaturated alfin monomer, alfin catalyst, molecular weight moderator and solvents; continuously effecting the polymerization of alfin monomer at an elevated temperature at which the reaction proceeds while controlling molecular weight by adjusting the amount of molecular weight moderator; continuously separating volatile materials including unreacted monomer, volatile low polymer, and solvent from the alfin polymer reaction mixture; steam-distilling such volatile materials from the resulting dispersion, and washing and drying the alfin polymer; the improvement which comprises continuously treating the reaction mixture with from about 0.01 to about 5 weight percent, based on the alfin monomer used, carbon dioxide to convert organometallic compounds of volatile acetylenes and cyclopentadienes into organic acid salts; extracting water-soluble organic acid salts of volatile acetylenes and cyclopentadiene from the reaction mixture in water; and recovering solvent for reuse that is substantially free from acetylenes and cyclopentadiene.

2. The process of claim 1 wherein the molecular weight of the polymer is controlled solely by adjustment of the proportion of molecular weight moderator, while maintaining reaction conditions, proportion of catalyst, and other process variables relatively constant.

3. The process of claim 1 wherein the polymerization is effected at a temperature within the range from about 40 to about 200° F.

4. The process of claim 1 wherein separation of volatiles by flashing is effected at a temperature within the range from about 50 to about 275° C. and at a pressure differential before and after flashing within the range from about 35 to about 500 p.s.i.

5. The process of claim 1 which includes quenching the reaction mixture with water directly after the carbon dioxide treatment, and steam-distilling volatiles from the resulting mixture.

6. The process of claim 1 wherein the steam-distillation is carried out at a temperature within the range from about 50 to about 130° C.

7. The process of claim 1 wherein the alfin catalyst is sodium allyl-sodium isopropoxide.

8. The process of claim 1 wherein the molecular weight moderator is a dihydroaromatic component.

9. The process of claim 1 wherein the dihydroaromatic component is a dihydronaphthalene.

10. The process of claim 1 wherein the monomer is butadiene.

11. The process of claim 1 wherein the monomer is butadiene and isoprene.

12. The process of claim 1 wherein the monomer is butadiene and isoprene.

13. The process of claim 1 wherein the alfin catalyst and sodium dispersion used for making the alfin catalyst are prepared in the same solvent employed for the alfin monomer polymerization reaction, and solvent is recycled to all three steps.

14. The process of claim 1 wherein the moderator is in an amount within the range from about 0.1 to about 10%.

15. The process of claim 1 wherein the amount of monomer employed is calculated to give an alfin polymer concentration in the reaction solution within the range from about 2 to about 25 weight percent.

16. A process in accordance with claim 1 in which an alfin polymer is produced of from about 30 to about 110 Mooney.

17. A process in accordance with claim 1 in which volatiles are removed by quenching in hot water at from about 50 to about 130° C.

18. A process in accordance with claim 1 which includes washing the reaction mixture with water before separating solvent and unreacted monomer.

19. A process in accordance with claim 18 in which the water is flowed countercurrently to the reaction mixture during the washing.

20. In the continuous process for the preparation of alfin polymers from alfin monomers which comprises continuously blending an organic unsaturated alfin monomer, alfin catalyst, molecular weight moderator and solvent; continuously passing the blend through a reaction zone while effecting the polymerization of alfin monomer at an elevated temperature at which the reaction proceeds while controlling molecular weight by the selected amount of molecular weight moderator; withdrawing from the reaction zone alfin polymer-containing reaction mixture having a Mooney of at least 70% of the desired Mooney and an alfin polymer concentration of from about 2 to about 25 weight percent; blending the reaction mixture with water at a temperature of from about 50 to about 130° C.; injecting steam into the reaction mixture; and separating and recovering volatile materials including unreacted monomer, volatile low polymer, and solvent from the quenched alfin polymer reaction mixture; and washing and drying the alfin rubber; the improvement which comprises continuously treating the reaction mixture with from about 0.01 to about 5 weight percent, based on the alfin monomer used, carbon dioxide to carbonylate organometallic compounds of volatile acetylenes and cyclopentadiene, including acetylides and cyclopentadiene metal compounds to the corresponding acid salts; extracting organic acid salts of such volatile acetylenes and cyclopentadiene in water; and separating and recovering monomer and solvent for reuse that are substantially free from acetylenes and cyclopentadiene.

21. A process in accordance with claim 20 in which alfin catalyst is prepared in an inert solvent for use in the process, starting from sodium suspended in an inert solvent, methyl-n-alkyl carbinol and olefin, and such solvent, carbinol and olefin are also recovered in the steam distillation, and at least the solvent recycled.

22. A process in accordance with claim 20 which includes flashing of the reaction mixture at a temperature within the range from about 50 to about 275° C. and at a pressure differential before and after flashing within the range from about 35 to about 500 p.s.i. before blending the reaction mixture with water, and separately recovering dry monomer and solvent from wet monomer and solvent.

References Cited
UNITED STATES PATENTS

| | | | |
|---|---|---|---|
| 2,953,556 | 9/1960 | Wolfe | 260—94.7 |
| 3,067,187 | 12/1962 | Greenberg | 260—94.2 |
| 3,223,691 | 12/1965 | Greenberg | 260—93.5 |
| 3,265,758 | 8/1966 | Hedman | 260—680 |
| 3,306,949 | 2/1967 | Mertzweiller | 260—680 |
| 3,317,437 | 5/1967 | Hoffman | 252—431 |
| 2,631,175 | 3/1953 | Crouch | 260—669 |
| 3,135,716 | 6/1964 | Uraneck et al. | 260—45.5 |
| 3,177,190 | 4/1965 | Hsieh | 260—94.2 |

JOSEPH L. SCHOFAR, Primary Examiner

J. C. HAIGHT, Assistant Examiner

U.S. Cl. X.R.

260—80.7, 83.7, 85.1, 94.2, 94.7